United States Patent Office 3,060,157
Patented Oct. 23, 1962

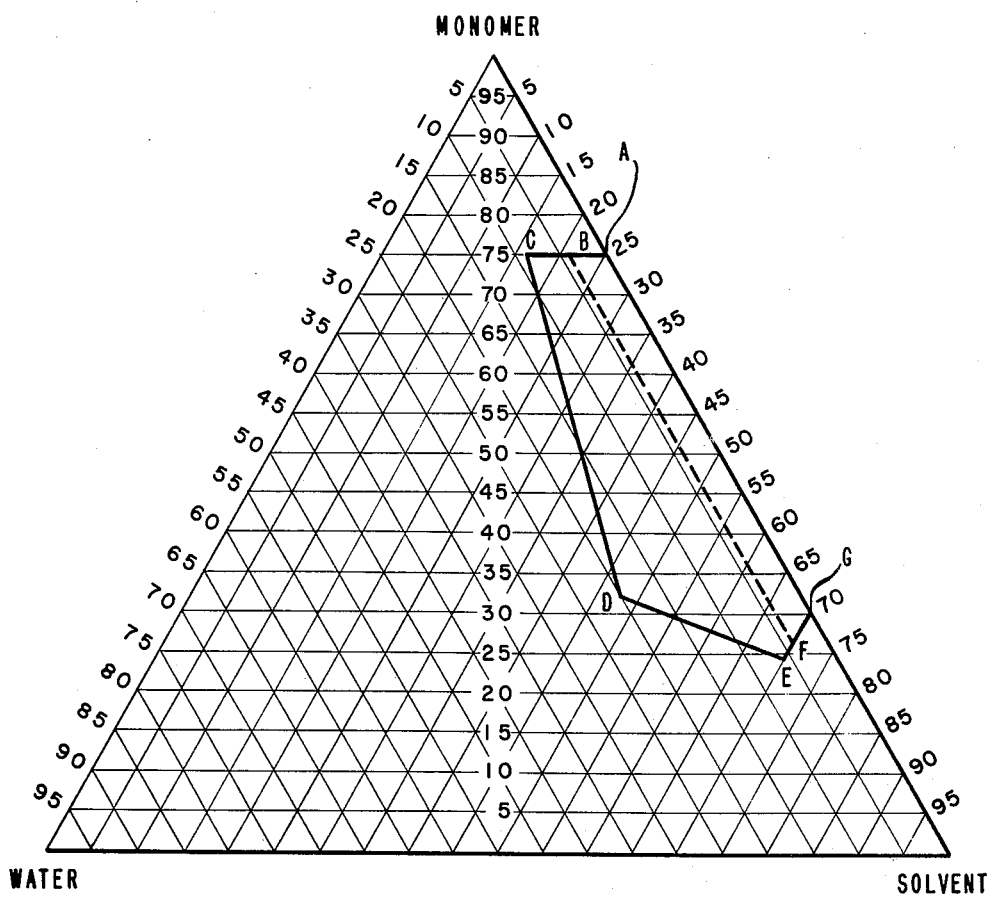

3,060,157
ACRYLONITRILE POLYMERIZATION
Albert Goodman and Lester David Grandine, Jr., Wilmington, Del., and William George Vosburgh, West Chester, Pa., assignors to E. I. du Pont de Nemours and Company, Wilmington, Del., a corporation of Delaware
Filed Nov. 4, 1957, Ser. No. 694,250
11 Claims. (Cl. 260—79.3)

This invention is concerned with a new process for preparing polymers of acrylonitrile.

In one known procedure for preparing polymers of acrylonitrile, the polymerization is conducted in an aqueous medium. The polymer is recovered from the reaction product mixture by filtration and then washed and dried. Spinning solutions may be prepared by dissolving the dried polymer in a solvent.

This procedure is expensive because the steps of polymer recovery, washing, drying, storage and solution preparation are laborious and time-consuming and require costly machinery. In addition, special care must be taken to prevent deterioration of polymer properties, such as color or solubility. A process which permitted utilization of an acrylonitrile polymerization reaction product mixture directly (without isolation of polymer) in preparation of a spinning solution would be extremely advantageous.

It has been proposed in U.S. 2,528,710 to batch polymerize acrylonitrile in a solvent for the polymer such as dimethylformamide using a $BF_3$:DMF complex as a catalyst. Such polymerizations have the commercial disadvantages of having a rather low productivity (0.3 to 2.5% solids per hour in the product) and of gelling at conversions as low as 6%. This premature gelling renders control of the polymerization extremely difficult and makes necessary the use of expensive batch processing.

It has also been proposed in U.S. 2,768,148 to batch polymerize a 5–90% solution of acrylonitrile in an aliphatic cyclic carbonate or a lactone and to use the reaction product mixture either directly or with purification as a spinning solution. However, such a polymerization has relatively low productivity (2.5 to 3.8% solids per hour) and gels at rather low conversions. This patent discloses that attempts to use dimethylformamide in a similar polymerization produced orange or brown colored solutions of polymers whose viscosity was too low to give textile materials of good properties.

U.S. 2,425,192 discloses a batch polymerization of acrylonitrile in a hydrotropic salt solution such as $ZnCl_2$. Such polymerizations are typically slow and produce gels. Moreover, the reaction product mixture cannot be used directly in dry spinning.

Other prior art processes have involved batch polymerization of acrylonitrile in various media, but such polymerizations have been characterized by low productivity and such low solids content as to be unfeasible for preparation of spinning solutions directly from the reaction product mixture.

An object of this invention is to provide a process for preparing polymers of acrylonitrile (including copolymers containing at least 85% combined acrylonitrile) at commercially acceptable rates of conversion so as to provide a reaction product mixture having high solids content, and yet having sufficient fluidity to be handled in a continuous manner for the preparation of a spinning or casting solution directly from the slurry (without intermediate isolation of the polymer).

A further object of this invention is to provide a process as above for the preparation of polymers of acrylonitrile having improved color. Another object is to provide a process of polymerizing acrylonitrile such that the polymerization reaction product mixture can be treated in a stripping column using a vapor stream comprising a solvent for the polymer to yield as the column effluent at least a 10% solution of the polymer substantially free of materials more volatile than the solvent.

These objects are achieved by polymerizing acrylonitrile or a monomer mixture comprising 85% or more acrylonitrile (the remainder a copolymerizable monomer or monomers) in a solvent medium comprising a solvent for the resulting polymer and up to about 20% water based on reaction mixture weight. Preferably, the reaction mixture contains between about 4% and about 20% water. It is important that the polymerization reaction be carried out continuously under steady state conditions and preferably under equilibrium conditions. That is, the polymerization takes place in a substantially constant environment. Reaction conditions necessary in this invention are feeds indicated by points falling within the area ACDEG in the figure.

Preferred reaction conditions are encompassed by the area BCDEF. The reaction is carried out at a temperature between about 35° C. and about 80° C. using a free radical initiator which can be thermally decomposed or used in conjunction with a redox system. The reactant feed comprises between about 24.5% to about 75% monomers, and between about 17.5% and about 70% solvent media. Conversion of monomers to polymer is controlled between about 20% and about 70% at a productivity of at least 7% polymer formed per hour. Productivity rate is a measure of the actual polymer formed—in terms of total polymerization feed—in an hour from the reactor used, and is important in determining the commercial utility of a process.

In the following examples all proportions and percentages are by weight unless otherwise noted. The percentages of all ingredients of the initiating systems are based on the total monomer feed (BOM).

EXAMPLE I

This example is intended to compare the effect of a continuous polymerization (constant environment) with that of a batch polymerization on the viscosity of the polymer slurry produced when all other variables are kept constant.

A. Constant Environment Polymerization

The polymerization is conducted in a stainless steel cylindrical reactor with openings at the top for a motor-driven stirrer paddle, a nitrogen inlet and condenser to return any vaporized monomer or solvent to the reaction vessel, and inlets for monomer feed, catalyst in N,N'-dimethylformamide (DMF) feed and water-containing sulfur dioxide and ferrous ammonium sulfate feed. A diagonal tube opening into the reaction vessel provides for the continuous overflow of the polymer slurry into a receiver. This opening is stirred by a screw-type blade during the start-up period only and the blade is then removed. Water, circulated through an outer metal jacket, has its temperature controlled by a thermostat inserted into the reaction vessel proper. The reaction vessel is charged with 550 grams monomer mixture, 400 grams DMF, and 100 grams water. After the contents of the reactor reach 55° C., the following reactants are metered into the reaction vessel at a rate so as to completely fill the vessel in 70 minutes: DMF, 38.25%; water, 6.75%; monomer mixture, 55%; (same as above—acrylonitrile, 94%; methyl acrylate, 6%); benzoyl peroxide, 0.25% (BOM); $SO_2$, 0.25% (BOM); and ferrous ion, 10 parts per million (p.p.m.) (BOM) in the form of ferrous ammonium sulfate. The polymer slurry overflows continuously. The pH is maintained at 2.9 by the inclusion of sufficient sulfuric acid in the water feed line. A pH of 2.2 to 4.5 is preferred for this initiating system. For more rapid attainment of equilibrium, the polymer slurry may be diluted 4:1 with water for a pH reading. Conversion values and inherent viscosity $[N]_h$ rapidly decrease at pH levels above 4.5. Thiourea or beta-mercaptoethanol is continuously added to the product at a rate equal to 0.25% of the monomer feed. The polymerization requires 300 minutes to reach a steady state condition and is then run for 90 minutes. The polymer in a timed sample of the reaction product mixture is precipitated with water, rinsed with acetone and dried to determine conversion and inherent viscosity. Samples of the overflow taken at various times indicate a fairly constant percent conversion (38.2% based on the feed), and a uniform inherent viscosity of 1.68. The slurry is thin (4 centipoises) and readily managed. Productivity is 18% (solids per hour).

B. Batch Polymerization

The same ingredients in same ratios as used in the continuous process A, above, are added to a glass flask fitted with a stirrer, nitrogen inlet and condenser and batch polymerized at a temperature of 55° C. A 37.2% conversion is obtained in one hour at which time the consistency of the polymer slurry is high—greater than 10,000 centipoises. The product is a crumbly solid similar to cottage cheese, so that it can no longer be stirred. Inherent viscosity of the polymer is 1.7.

A polymer slurry similar to that obtained in Example I-A containing 25% solids (acrylonitrile/methyl acrylate=96/4), 19% acrylonitrile monomer, 7% water, and 49% DMF is introduced onto the top plate of a six inch diameter distillation column containing seven sieve plates. The absolute pressure on the top plate is controlled at 100 mm. Hg. Dimethylformamide vapor from a boiler is introduced below the bottom plate and a viscous solution (50–100 poises) of polymer in DMF containing very little water or acrylonitrile monomer is withdrawn from the bottom of the column. The overhead vapor containing dimethylformamide, water, and acrylonitrile is condensed in a receiver and recycled to the polymer reactor for continuous operation. Distillation is continued for a total of 5 hours. A typical analysis of the product from the bottom of the column, which is a clear solution, shows: 16.2% polymer, 0.20% water, less than 0.1% acrylonitrile, and 83.5% DMF.

The above product is suitable for use in casting films or wet spinning, but for some applications it is desirable to have a higher concentration of polymer. For these applications, the product from the above distillation is further concentrated by running through a Turba-film evaporator (Rodney Hunt Machine Company of Orange, Massachusetts). With various evaporator rotor speeds and steam pressures, solutions ranging from 20 to 39% solids are easily achieved. Obviously, other equipment may be used.

A polymer solution prepared by distillation as above and containing 24% polymer in DMF is dry spun through a spinneret containing 5 orifices, each 0.0065 inch in diameter, into air at 190° C., and the resulting yarn wound up at 100 yards per minute. After extracting the residual DMF from the yarn with water at 100° C., the yarn is drawn 8× in 33 p.s.i. steam. The resulting yarn has a tenacity of 6.1 grams per denier, an ultimate elongation of 22%, and a denier per filament of 2.6. It has an excellent color and is considered a top-grade yarn in all respects.

In order to obtain polymer solutions from the stripping column containing 15–25% solids, the feed to the top plate must contain no more than 10% water in order for the column to operate satisfactorily.

EXAMPLE II

The polymerization of Example I-A is repeated with the substitution of N,N'-dimethylacetamide (DMAC) in place of the DMF. The pH is adjusted to 3.8 by the metered addition of $H_2SO_4$. The hold-up time is 107 minutes. A slurry containing 27% solids (a productivity of 15.1% solids per hour) with a viscosity of 106 centipoises and yielding polymer having an inherent viscosity of 1.27 is obtained. Similar results are obtained when succinonitrile is used in place of DMAC.

EXAMPLE III

The polymerization reaction of Example I-A is repeated with dimethylsulfoxide in place of DMF, the benzoyl peroxide level raised to 0.4%, the pH adjusted to 3.4, and a hold-up time of 105 minutes. A slurry containing 25% solids (a productivity of 14% solids per hour) with a viscosity of 10.5 centipoises and yielding a polymer of inherent viscosity 3.1 is produced.

EXAMPLE IV

Various mixtures of acrylonitrile, other monomers as noted in Table I, DMF, water, benzoyl peroxide ($Bz_2O_2$), sulfur dioxide and ferrous iron expressed as parts per million of the ferrous ion are continuously polymerized using the technique of Example I-A. The results are shown in Table I.

Table I (runs 2–8) shows that despite the 10 to 20 times greater concentration of catalyst that is used at the lower monomer concentrations, productivity is significantly lower than that obtained at higher monomer concentrations. In addition, as the monomer concentration is increased at a relatively constant DMF/water ratio, the trend of the molecular weight as indicated by inherent viscosity $[N]_h$ is upward.

Runs 11, 12, 13 of Table I show the importance of temperature in the polymerization of this invention. It can be seen that as the temperature changes from 55 through 65 to 75° C., at similar high levels of solids, the consistency of the polymer slurry increases tremendously even at the steady state conditions of a constant environment polymerization. The same start-up techniques are used for runs 12 and 13.

Runs 14–20 in Table I show various initiating systems in the polymerization process of this invention. Polymerizations are run under steady state conditions.

TABLE I

| Run | Monomers | | | Media, DMF/H₂O | Initiating system | | | pH | Temp., °C. | Holdup time | Solids, percent | Productivity, percent solids/hour | [N] | Consistency (centipoises) |
|---|---|---|---|---|---|---|---|---|---|---|---|---|---|---|
| | Total percent of feed | Comonomer | Percent BOMᵃ | | $Bz_2O_2$ ᵇ | $SO_2$ | Fe⁺⁺ p.p.m. | | | | | | | |
| 2 | 70 | | | 80/20 | 0.028 | .25 | 10 | 2.8 | 55 | 60 | 15 | 15 | 1.89 | <200 |
| 3 | 60 | | | 90/10 | 0.10 | .25 | 10 | 3.6 | 55 | 70 | 31.7 | 27.2 | 1.75 | 160 |
| 4 | 55 | NaASAᶜ | 0.9 | 80/20 | 0.20 | .25 | 10 | 3.2 | 55 | 70 | 27 | 23.2 | 2.0 | <200 |
| 5 | 50 | | | 80/20 | 0.15 | .25 | 10 | | 60 | 62 | 25 | 24 | 1.67 | <200 |
| 6 | 30 | | | 80/20 | 0.40 | .16 | 10 | | 60 | 126 | 17.5 | 8.3 | 0.98 | 200–450 |
| 7 | 25 | | | 80/20 | 0.80 | .10 | 10 | | 50 | 135 | 17 | 7.6 | 1.00 | 150–250 |
| 8 | 20 | | | 80/20 | 2.0 | .25 | 10 | | 55 | 100 | 10.5 | 6.3 | 0.90 | ≪100 |
| 9 | 55 | NaES ᵈ | 0.8 | 90/10 | 0.25 | 1.00 | 10 | 2.0 | 55 | 100 | 24 | 14.4 | 1.44 | 298 |
| 10 ᵉ | 55 | Et₃NES ᵇ | 0.42 | 85/15 | 0.20 | .145 | 10 | | 55 | 97 | 25–30 | 15.5–18.6 | 1.53 | 80–95 |
| 11 | 55 | | | 80/20 | 0.20 | .25 | 10 | 3.2 | 55 | 70 | 26 | 22.3 | 1.88 | <100 |
| 12 | 55 | | | 80/20 | 0.20 | .25 | 10 | 3.2 | 65 | 70 | 29 | 24.8 | 1.90 | 87 |
| 13 | 55 | | | 85/15 | 0.10 | .25 | 10 | 3.0 | 75 | 70 | 27.5 | 23.6 | 1.6 | >10,000 |
| 14 | 55 | | | 85/15 | ᵍ 0.10 | .10 | 2.5 | 5.1 | 55 | 70 | 16.5 | 14.1 | | 1.4 |

See footnotes at end of table.

TABLE I—Continued

| Run | Monomers | | | Media, DMF/H₂O | Initiating system | | | pH | Temp., °C. | Holdup time | Solids, percent | Productivity, percent solids/hour | [N] | Consistency (centipoises) |
|---|---|---|---|---|---|---|---|---|---|---|---|---|---|---|
| | Total percent of feed | Comonomer | Percent BOM [a] | | Bz₂O₂ [b] | SO₂ | Fe⁺⁺, p.p.m. | | | | | | | |
| 15 | 50 | | | 85/15 | [h] 0.20 | .25 | 0.0 | | 75 | 150 | 24 | 9.6 | 0.88 | <4,000 |
| 16 | 55 | | | 85/15 | [i] .20 | 0.10 | 0.0 | 4.5 | 55 | 105 | 18 | 10.3 | 1.36 | 425 |
| 17 | 55 | | | 85/15 | [j] .423 | 1.05 | None | 2.9 | 45 | 105 | 19.8 | 11.3 | 1.9 | 5.5 |
| 18 | 60 | Zn(ES)₂ [k] | 0.5 | 90/10 | [l] .20 | 0.25 | [m] 0.10 | 4.5 | 55 | 70 | 23 | 19.7 | 1.84 | 6 |
| 19 | 55 | Et₃NES [f] | 0.28 | 85/15 | [l] .20 | 0.25 | [n] 0.20 | 4.1 | 55 | 105 | 25 | 14.3 | 1.51 | 124 |
| 20 | 60 | None | | 100/0 | .40 | 0.0 | 0.0 | | 78 | 45 | 19 | 25.4 | 1.45 | <100 |

[a] BOM—based on monomers, i.e., total methyl acrylate and acrylonitrile which was in a ratio of 6/94 for all polymerizations. [b] Benzoyl peroxide. [c] NaASA—sodium allyl sulfonate. [d] NaES—Sodium ethylene sulfonate. [e] Contained 0.07% triethylamine. [f] Et₃NES—Triethylammonium ethylene. [g] Diacetyl peroxide. [h] α,α′-Azodiisobutyronitrile. [i] α,α′-Azobis(α,γ-dimethylvaleronitrile). [j] (NH₄)₂S₂O₈. [k] Zn(ES)₂—Zinc ethylene sulfonate. [l] Bz₂O₂. [m] Dimethyl aniline. [n] di-Etaniline.

One of the most important properties of a synthetic fiber is its color. Although color is difficult to measure, an excellent correlation has been made with the color of the spinning solution termed "color value," as measured by 100× the optical density of the solution at 400 millimicrons against a sample of pure solvent using a Beckman Model Du spectrophotometer.

The slurry produced in run 19 of Table I to which has been added 0.08% of thiourea to shortstop the polymerization is diluted with sufficient DMF to give a 17% solids slurry and converted in a resin kettle under 100 mm. of mercury (absolute) heated by a steam bath to a spinning solution containing 30% polymer and 70% DMF. The color value of the solution is 15.0.

A slurry produced in run 10 of Table I and shortstopped as above is similarly converted to a spinning solution containing 30% polymer and 70% DMF. The color value of this solution is 19.

EXAMPLE V

An acrylonitrile copolymer prepared by a conventional procedure in an aqueous constant environment polymerization system but using a ratio of NaHSO₃ to K₂S₂O₈ of 10 to 1 at a pH of 2.4 and having an intrinsic viscosity of 1.51 is formed into a slurry with the following composition: 250 grams of polymer, 300 grams of acrylonitrile, 67 grams of water, 842 grams of DMF, and 0.26 gram of thiourea. This slurry is converted into a solution containing 30% polymer and 70% DMF as in Example IV. It has a high color value of 26.2 despite the fact that the polymer was the whitest producible by prior art methods. Polymers obtained by polymerization in accordance with this example are more resistant to color formation than any known aqueous polymerized polymer of acrylonitrile.

EXAMPLE VI

Mixtures containing DMF, monomers (94% acrylonitrile, 6% methyl acrylate), 0.13% hydrogen peroxide (BOM), and .072% thiourea (BOM) are mixed with varying amounts of water, placed in tubes previously flushed with nitrogen, the tubes with their contents cooled to −80° C., flushed with nitrogen and then sealed under nitrogen. The tubes are allowed to warm to room temperature and then placed in a 30° C. water bath for 2 hours. The results are given in Table II.

TABLE II

| Polymerization components, percent of total | | | Conversion, percent | Solids in product | Productivity | Polymer, [N]ₕ |
|---|---|---|---|---|---|---|
| Water | DMF | Monomer | | | | |
| 0 | 40.0 | 60.0 | 30 | 18.0 | 9.0 | 1.23 |
| 1.96 | 39.2 | 58.8 | 32 | 18.8 | 9.4 | 1.36 |
| 3.84 | 38.4 | 57.6 | 44 | 25.2 | 12.6 | 1.42 |
| 7.4 | 37.0 | 55.5 | 52 | 28.8 | 14.4 | 1.66 |

Table II shows that productivity and inherent viscosity increase with increasing water content. Similar results are obtained in constant environment polymerization system with the notable exception that the polymerization under the latter conditions produces fluid slurries suitable for direct production of spinning solutions as shown above, whereas all of the polymerizations listed in Table II gelled and set to a crumbly solid at the conversions noted.

EXAMPLE VII

A series of continuous polymerizations are run using 60% monomers (94% acrylonitrile and 6% methyl acrylate), 0.10% benzoyl peroxide (BOM), 0.25% SO₂ (BOM), and 10 p.p.m. of ferrous iron (BOM) at 55° C. with a holdup time of 70 minutes. The slurries are continuously short-stopped against further polymerization by the addition of 0.1% thiourea based on the monomer feed. The only variable among the runs is the amount of water in the DMF. Results are given in Table III.

TABLE III

| DMF/water | [N]ₕ | Productivity |
|---|---|---|
| 100/0 | 1.79 | 4.1 |
| 90/10 | 1.75 | 27.2 |
| 70/30 | 2.0 | 24.8 |

Table III shows the very significant effect of as little as 4% water in the polymerization reaction mixture.

EXAMPLE VIII

This example illustrates the use of the process of this invention in making copolymers of acrylonitrile. Into a vessel of two liters capacity, jacketed for heating with circulated water and equipped with a stirrer is fed continuously a mixture of acrylonitrile and other monomers (Table IV) to the extent of 50% of the total feed, initiators (Table IV), and an 85/15 mixture of dimethylformamide in water constituting 50% of the total feed, at such a combined rate that the reactor is completely filled in 100 minutes. The product flows out of the reactor by gravity and polymerization thereof is stopped by adjusting to pH 7 by the addition of triethyl amine and by adding 0.2% thiourea based on the weight of the polymer present in the reaction product mixture. In run 25, poly N-vinyl pyrrolidone is continuously added at the rate of 2.5% of the total monomer feed in the form of a 6% dimethylformamide solution to the reactor. Table IV summarizes the results of these polymerizations.

In each case the product is converted into a solution suitable for spinning by dilution to about 17% solids with DMF evaporation of the excess unreacted monomers and removal of water and DMF under a vacuum of 100 mm. mercury pressure (absolute) until a solution of 25–30% solids is obtained.

TABLE IV

| Run | Comonomer | Percent of total monomer | Bz$_2$O$_2$ [b] | SO$_2$ | Et$_3$N [c] | Temp., °C | pH | [N] | Conversion, percent |
|---|---|---|---|---|---|---|---|---|---|
| 21 | Vinylidine chloride | 20 | 0.25 | 0.15 | 0.08 | 45 | 2.8 | 1.6 | 48 |
| 22 | N-vinyl pyrrolidone | 10 | 0.25 | 0.08 | 0.08 | 55 | 3.2 | 1.5 | 50 |
| 23 [d] | Acrylamide | 5 | 0.25 | 0.10 | 0.05 | 55 | 3.2 | 1.7 | 55 |
| 24 | N-methylolacrylamide/triethylammonium styrene sulfonate | 0.6/1.4 | 0.20 | -------- | [e] 0.5 | 45 | 4.5 | 1.6 | 41 |
| 25 | Triethylammonium styrene sulfonate | 1.5 | 0.20 | 0.15 | 0.7 | 55 | 2.8 | 1.9 | 46 |

[a] 0.006% Fe$^{++}$ (BOM) is used in all runs.  [b] Benzoyl peroxide.  [c] Triethyl amine.  [d] Holdup time of 120 minutes; all others 100 minutes.
[e] Dimethyl aniline.

Even when using the preferred polymerization reaction mixture of this invention, a sharp increase in polymer slurry viscosity can occur after about 1 to 2 complete turnovers of the reactor volume. The time required to fill the reactor or cause a turnover of the volume is known as the holdup time. Such an increase in viscosity can be so great that stirring the slurry is impossible and the polymerization runs out of control. However, by approaching or reaching equilibrium or steady state conditions at a lower level of solids than that ultimately desired and then increasing the solids content, a continuous system can be handled without the occurrence of an uncontrollable viscosity. According to one method, catalyst is added to the reaction at about 10% to 80% of the ultimately desired feed rate for a time required to replace the reactor volume three times, then the catalyst feed is increased to the level desired for steady state conditions. The reaction product slurry is discarded until approximate steady state conditions are obtained (three turnovers of the reactor volume afford conditions within 10% of equilibrium).

Alternatively, the polymerization can be started using the feed rates finally desired but maintaining the temperature about 10° C. below the ultimately desired temperature. After three reactor turnovers, the temperature is raised and three additional reactor turnovers are discarded before steady state conditions are approximately reached and the desired polymer slurry collected. Another method is to use a reduced holdup period for several reactor turnovers and then increase the holdup time to the desired level.

Since the above methods always require more time and involve a certain waste, the following method is preferred since it is only applied when a viscosity maximum starts to occur. The polymerization reaction is started with all conditions as desired for the final steady state conditions. If the polymer slurry thickens to a viscosity greater than 300 centipoises, the flow of the polymer solvent solution of the activator is increased about 100%. This combination of high solvent level and high activator level is continued for 15 minutes and then reduced to the original levels. The polymer slurry is discarded for three reactor turnovers of the reactor volume before polymer is collected.

In the absence of the novel polymerization conditions of this invention, such start-up techniques by themselves do not permit the continuous production of polymer slurries of high solids content and low viscosity which can be used directly in the preparation of spinning solutions. Such an approach is, of course, no value in batch polymerization.

The expression inherent viscosity, $[N]_h$, as used in the examples, is defined as $$\frac{\ln N_r}{c}$$

wherein $c$ is the concentration of the polymer in 100 ml. of the solvent and $N_r$ is the symbol for relative viscosity, which is the ratio of the flow time of the polymer solution relative to the flow time of the solvent. The viscosity measurements were made on ½% solutions of the polymer in DMF at 25° C.

In some examples, the expression "intrinsic viscosity," [N], is used and is defined as:

$$\text{limit} \left[ \frac{\ln N_r}{c} \right]_{c \to 0}$$

When other variables are kept constant, the degree of conversion is proportional to the hold-up time in the reactor.

Acrylonitrile polymer slurries as prepared are quite corrosive. Therefore, in addition to adding a polymerization inhibitor to stop polymerization, a neutralizing agent should be added. Tertiary amines are especially suitable for this purpose, as they afford haze-free solutions. Triethylamine at the rate of 0.4% (BOM) effectively neutralized the product of run 10 (Table I).

The following compounds are effective in stopping polymerizations at the 0.4% level (BOM): diphenylthiourea, thiourea, hydroxylamine hydrochloride, tetramethylthiouram disulfide, thioacetamide, thioglycollic acid, thiosorbitol disulfide, 1-thioglycerol, zinc dimethyldithiocarbamate and the zinc salt of 2-mercaptobenzothiozale in the amount of about 0.4% or less as required.

The process of this invention has been illustrated with the copolymerization of acrylonitrile with methyl acrylate and monomers containing sulfonate groups. Any monomers copolymerizable with acrylonitrile as disclosed in U.S. 2,456,360 to Arnold, U.S. 2,436,926 to Jacobson, U.S. 2,491,471 to Arnold, or U.S. 2,527,300 to Dudley can be used. Comonomers should preferably be used in such amounts that the resulting polymer contains 85% or more combined acrylonitrile in order to have fibers with desirable physical properties.

The total concentration of all monomers in the polymerization reaction will be from about 24.5% to about 75% by weight total polymerization reaction mixture and preferably between about 40% and about 75% because of the higher productivities and higher molecular weights with a given initiator content at the higher monomer levels.

Although this invention has been illustrated primarily by the use of dimethylformamide (DMF) and dimethylacetamide (DMAC) as solvents for the polymer, other solvents may be used, such as dimethyl sulfoxide, succinonitrile, tetramethylenesulfone, and the like. DMF and DMAC are preferred because of the ability of polymer slurries in these solvents to be more readily converted into spinning solutions (due to the lower boiling points, 153 and 165° C., respectively) and the subsequent conversion of such solutions by dry or wet methods of spinning at commercial levels into fibers of the finest quality.

The solvent comprises from about 17.5% to about 70% of the polymer feed by weight. The solvents may be used undiluted, or a non-solvent for the polymer may be used as a diluent in the amount of 0 to 20% of the total reactor feed. Water is the preferred diluent. A mixture of a solvent for the polymer produced and about 4% to 20% water based on the weight of total polymerization reaction mixture is preferred as against pure solvent due to the higher productivity and higher molecular weight of the polymer obtained at a given initiator level. Also, at solvent/diluent ratios of 40/60 or less and at certain monomer concentrations a 3-phase system with the monomer occurs which causes the formation of hard, grainy particles of polymer that are unsuitable for processing. The presence of water is also preferred to obtain a better solution of certain comonomers.

In general, all polymerizations are conducted under an atmosphere of an inert gas as nitrogen or $CO_2$.

Any suitable polymerization initiation system can be used that is soluble in the reaction mixture. Systems should preferably be selected that are sufficiently active at temperatures below 80° C. in order to obtain a high productivity (7% or greater), a satisfactory molecular weight ([N] of 1.0 or greater preferably), slurries of low consistency (less than 50 poises), and fibers of good color.

Peroxides of the structure RCO—OO—COCR where R is alkyl or aryl (i.e., diacyl or diaroyl peroxides) are especially suitable as initiators in the process of this invention. They may be thermally decomposed, but for the sake of easier control (less temperature sensitive) and better color (lower possible polymerization temperatures), a redox system is preferred. The redox combinations of such a peroxide with $SO_2$ and an oxidizable heavy metal ion such as $Fe^{++}$ or an N,N'-dialkyl aniline are especially useful. (Salts of perdisulfuric acid are useful in a redox system.)

Organic azo compounds as disclosed in U.S. Patent 2,471,959 wherein the azo, —N=N—, group is acylic and bonded from both of the nitrogens to carbons which are aliphatic in character and at least 1 of which carbons is tertiary, are useful in this process. Run 15 in Table I illustrates the use of an azo catalyst by thermal initiation, namely α,α'-azodiisobutyronitrile. Run 16 illustrates the use of an azo catalyst that is thermally decomposed at a lower temperature, namely α,α'-azobis (α,γ-dimethylvalero-nitrile).

Although initiators can be thermally decomposed to start polymerizations, an activated decomposition that is less subject to the restricted temperature control of thermal initiation is preferred in this invention. An activator system comprising an oxidizable oxygen-containing sulfur compound such as $SO_2$, and an oxidizable ion of a heavy metal, such as iron, manganese, lead, cobalt, or chromium at a pH of 2.2 to 4.5 is very satisfactory. An activator system preferred to the above is obtained by replacing the heavy metal ion with an N,N-dialkyl aniline, such as dimethyl aniline or diethyl aniline, and using a reducing acid such as $SO_2$, $H_3PO_2$, $NaHSO_3$, benzene phosphinic acid, $NaOSOCH_2OH$ or $$Zn(OSOCH_2OH)_2$$

to adjust the pH at about 3 to 6.5. This affords a whiter color polymer and the productivity and inherent viscosity are less sensitive to pH.

The polymerization reaction of this invention is advantageous in permitting rapid production of acrylonitrile polymers at molecular weights satisfactory for good fiber formation. Moreover, these polymers are obtained in the form of reaction product mixtures having compositions and consistencies such that these mixtures can be directly converted into solutions that are suitable for spinning without the expensive and product-deteriorating steps of polymer separation, washing, drying, and solution preparation.

The polymerization products of this invention may be converted directly to spinning or casting solutions by distilling off unreacted monomer and diluent or by replacing the unreacted monomer or diluent with polymer solvent in a stripping column. It may be desirable to dilute the polymerization product with polymer solvent before doing this. If the polymer slurry (diluted or not) is to be concentrated in a stripping column, it should preferably contain no more than 10% water because of operating difficulties of the stripping column. Higher amounts of water are also undesirable due to the excessive dilution (by the solvent) that occurs in a stripping column as a result of the high heat of vaporization of water compared to the solvent (with DMF approximately 4:1).

The copolymer and terpolymers prepared in the process of this invention are particularly useful in the preparation of textile fibers because they are obtained in whiter shades than is possible using conventional polymerization techniques.

The claimed invention:

1. In a process for preparing a polymer of acrylonitrile which comprises continuously polymerizing in the presence of a polymerization catalyst a monomeric material comprising 94% acrylonitrile and 6% methyl acrylate at a temperature between about 35° C. and about 80° C. under a substantially constant environment in which the components comprising the reaction medium are present in amounts corresponding to a feed of about 1.96% water, about 39.2% dimethylformamide, and about 58.8% of said monomeric material, said amounts being selected to provide a total of 100% of said components in said feed.

2. The process of claim 4 in which the monomeric material consists of acrylonitrile.

3. The process of claim 4 in which the monomeric material comprises acrylonitrile and methyl acrylate.

4. In a process for preparing a polymer of acrylonitrile which comprises continuously polymerizing in the presence of a polymerization catalyst a monomeric material comprising at least 85% acrylonitrile and up to 15% of an ethylenically unsaturated monomer copolymerizable with acrylonitrile at a temperature between about 35° C. and about 80° C. under a substantially constant environment in which the components comprising the reaction medium are present in proportions corresponding to a feed of from about 4% to about 20% water, from about 17.5% to about 70% of an organic solvent for said polymer selected from the group consisting of dimethylformamide, dimethylacetamide, dimethylsulfoxide, succinonitrile, and tetramethylenesulfone, and from about 24.5% to about 75% of said monomeric material, said proportions being selected to provide a total of 100% of said components in said feed.

5. The process of claim 4 in which the reaction is carried out in a liquid medium comprising dimethylformamide and water.

6. The process of claim 4 in which the reaction is carried out in a liquid medium comprising dimethylacetamide and water.

7. The process of claim 5 in which the monomeric material comprises at least 90% acrylonitrile.

8. The process of claim 5 in which the monomeric material comprises acrylonitrile, methyl acrylate, and sodium allyl sulfonate.

9. A process for preparing an article of an acrylonitrile polymer which comprises continuously polymerizing in the presence of a polymerization catalyst a monomeric material comprising at least 85% acrylonitrile and up to 15% of an ethylenically unsaturated monomer copolymerizable with acrylonitrile at a temperature between about 35° C. and about 80° C. under a substantially constant environment in which the components comprising the reaction medium are present in proportions corresponding to a feed of from about 4% to about 20% water, from about 17.5% to about 70% of an organic solvent for said polymer selected from the group consisting of dimethylformamide, dimethylacetamide, dimethylsulfoxide, succinonitrile, and tetramethylenesulfone, and from about 24.5% to about 75% of said monomeric material, said proportions being selected to provide a total of 100% of said components in said feed, removing from the polymerization reaction product mixture obtained unreacted monomeric material, said water and a sufficient amount of said solvent to provide a polymer solution having a viscosity of at least 25 poises, and thereafter forming said polymer solution into a shaped article.

10. The process of claim 9 in which the polymer solvent is dimethylformamide.

11. The process of claim 9 in which the polymer solvent is dimethylacetamide.

References Cited in the file of this patent

UNITED STATES PATENTS

| | | |
|---|---|---|
| 2,456,360 | Arnold | Dec. 14, 1948 |
| 2,471,742 | Harrison | May 31, 1949 |
| 2,471,743 | Harrison | May 31, 1949 |
| 2,696,483 | Ham | Dec. 7, 1954 |
| 2,777,832 | Mallison | Jan. 15, 1957 |